(12) United States Patent
Monaghan

(10) Patent No.: US 7,477,507 B1
(45) Date of Patent: Jan. 13, 2009

(54) ADJUSTABLE RECEIVER FOR DIGITAL SOUND STORAGE DEVICES

(75) Inventor: Jeffrey Owen Monaghan, Noblesville, IN (US)

(73) Assignee: Klipsch, LLC, Indianapolis, IN (US)

( * ) Notice: Subject to any disclaimer, the term of this patent is extended or adjusted under 35 U.S.C. 154(b) by 602 days.

(21) Appl. No.: 11/231,678

(22) Filed: Sep. 21, 2005

(51) Int. Cl.
 *H05K 5/00* (2006.01)
 *H05K 7/00* (2006.01)
(52) U.S. Cl. ........................ 361/679; 361/686
(58) Field of Classification Search ................ 361/679, 361/681, 683, 686; 381/334; 455/42, 344
See application file for complete search history.

(56) References Cited

U.S. PATENT DOCUMENTS

| | | | |
|---|---|---|---|
| 5,046,104 A | 9/1991 | Kloss | |
| 5,930,376 A | 7/1999 | Markow et al. | |
| 6,201,878 B1 | 3/2001 | Azima et al. | |
| 6,381,335 B2 | 4/2002 | Jaszkiewicz | |
| 6,711,005 B2 * | 3/2004 | Martin | 361/683 |
| 6,712,638 B2 * | 3/2004 | Fisher et al. | 439/374 |
| 2001/0031059 A1 | 10/2001 | Borgonovo | |
| 2003/0012397 A1 | 1/2003 | Gumer | |
| 2004/0156523 A1 | 8/2004 | Tuason et al. | |
| 2004/0162029 A1 | 8/2004 | Grady | |
| 2004/0171346 A1 | 9/2004 | Lin | |
| 2004/0224638 A1 | 11/2004 | Fadell | |
| 2004/0226079 A1 | 11/2004 | Rainey | |
| 2004/0234084 A1 | 11/2004 | Lennox | |
| 2005/0014536 A1 | 1/2005 | Grady | |
| 2005/0031148 A1 | 2/2005 | McNary | |
| 2005/0049022 A1 | 3/2005 | Mullen | |
| 2007/0047198 A1 * | 3/2007 | Crooijmans et al. | 361/686 |

* cited by examiner

*Primary Examiner*—Hae Moon Hyeon
(74) *Attorney, Agent, or Firm*—Matthew R. Schantz; Bingham McHale LLP

(57) ABSTRACT

An audio player assembly comprising a housing, at least one speaker mounted in the housing, a recess formed in the housing and defining a bottom wall, a pair of oppositely disposed side walls and an angled rear wall. A digital sound storage device connection port, electrically connected to the speaker, is formed in the recess. A slot is formed in the angled rear wall, with a wedge member slidably connected to the slot, wherein the wedge member may move along the slot to effectively vary the depth of the recess, snugly engaging digital sound storage devices of varying dimensions.

12 Claims, 3 Drawing Sheets

ADJUSTABLE RECEIVER FOR DIGITAL SOUND STORAGE DEVICES

TECHNICAL FIELD OF THE INVENTION

This invention relates to a stand-alone or unitary speaker system for connection to a digital sound storage device and, more particularly, to a mechanical connection assembly for accepting digital sound storage devices of different dimensions.

BACKGROUND OF THE INVENTION

A large number of digital sound storage devices are currently offered in the marketplace. One of the most popular is the IPOD® MP3 player commercially produced by Apple Computer, Inc. (1 Infinite Loop Cupertino, Calif. 95014). Such digital sound storage devices are popular largely because of their portability and ease of use. However, digital sound storage devices have typically been restricted to personal use, by way of headphones, and have generally not been desirable for transmitting music to a group of persons.

Recently, however, a number of audio player assemblies have entered the market for usage with digital sound storage devices that allow the transmitting of music to a large group of people. These audio player assemblies typically consist of a stand-alone or unitary speaker system with a "docking" port. The docking port is meant to receive a digital sound storage device, and audio signals from the digital sound storage device are transferred to the speaker system by various means and amplified by the speakers.

For example, the BOSE® SoundDock™ is an audio system with a unitary speaker system and a docking port (The Mountain, Framingham, Mass. 01701). The docking port is compatible with the IPOD MP3 player. However, the Sound-Dock system is only compatible with specific sizes of the IPOD. To accommodate smaller or larger digital sound storage devices, the SoundDock system would require extra hardware for consumers to purchase to adapt the SoundDock system to receive smaller or larger digital sound storage devices, thus adding additional expense and effort.

Another current "dockable" sound system is the ALTEC LANSING® InMotion™ system (Route 6 and 209, Milford, Pa. 18337). The InMotion system is also compatible with the IPOD. Similarly, the InMotion system has the same disadvantage as the SoundDock, in that it only accommodates digital sound storage devices of a specific, predetermined size and will require consumers with digital sound storage devices of other sizes to purchase additional adaptor hardware at additional expenses.

Currently, there is offered no audio player assembly that effectively eliminates the need to locate and retain independent hardware when changing the size or configuration of digital sound storage devices.

There is thus a need for a stand-alone or unitary speaker system that provides long-term customer satisfaction and eliminates the need to locate and retain independent hardware when changing the size or configuration of digital sound storage devices. The present invention addresses this need.

SUMMARY OF THE INVENTION

The present invention relates to a mechanical connection assembly for accepting digital sound storage devices of different dimensions. One object of the present invention is to provide an improved assembly for accepting digital sound storage devices of different dimensions without requiring additional hardware. Related objects and advantages of the present invention will be apparent from the following description.

DESCRIPTION OF THE PREFERRED EMBODIMENTS

Figure 1:
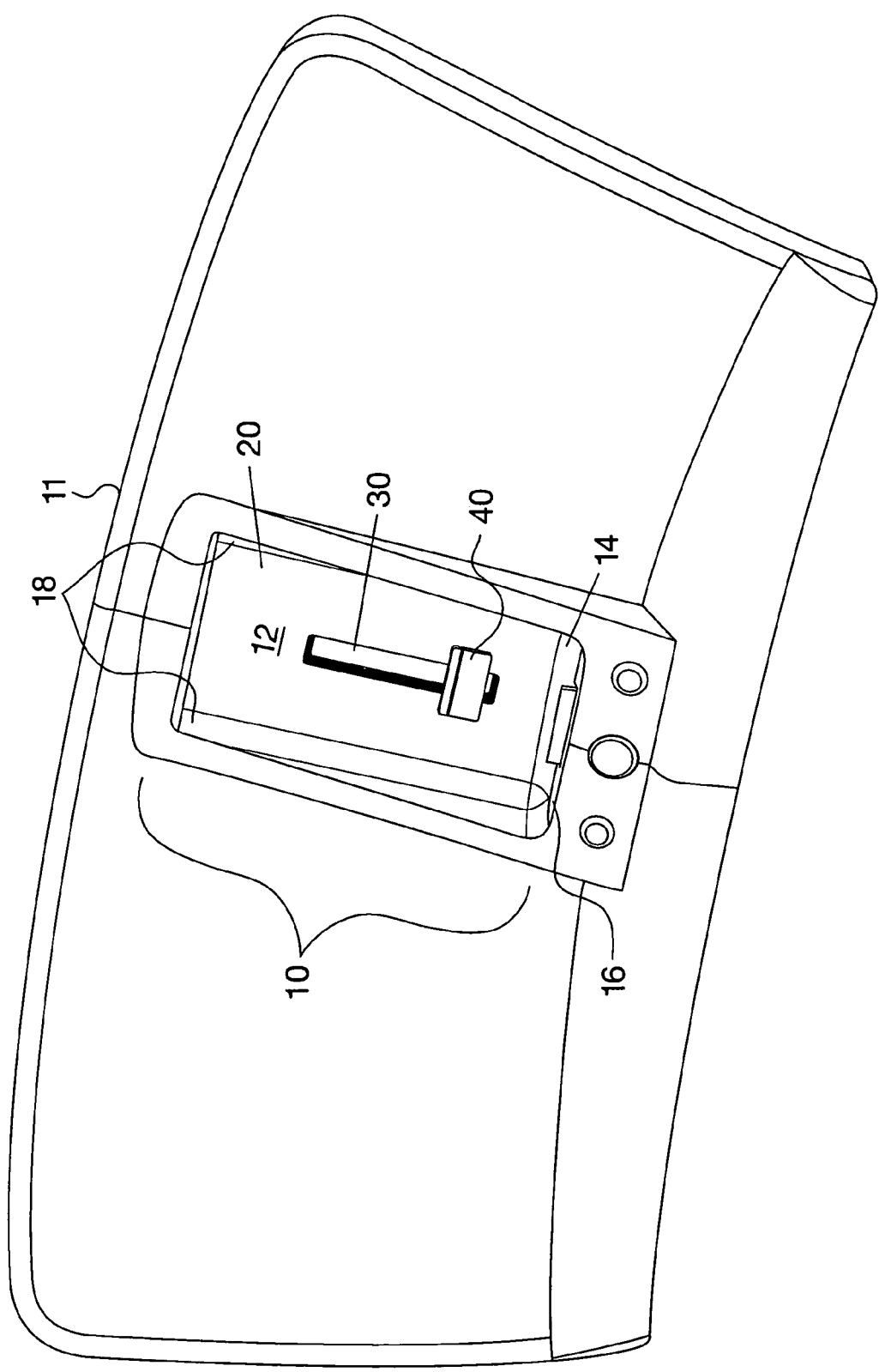
FIG. 1 is an elevation view of the mechanical connection assembly, according to one embodiment of the present invention.

For the purposes of promoting an understanding of the principles of the invention and presenting its currently understood best mode of operation, reference will now be made to the embodiments illustrated in the drawings and specific language will be used to describe the same. It will nevertheless be understood that no limitation of the scope of the invention is thereby intended, with such alterations and further modifications in the illustrated device and such further applications of the principles of the invention as illustrated therein being contemplated as would normally occur to one skilled in the art to which the invention relates.

Figure 2:
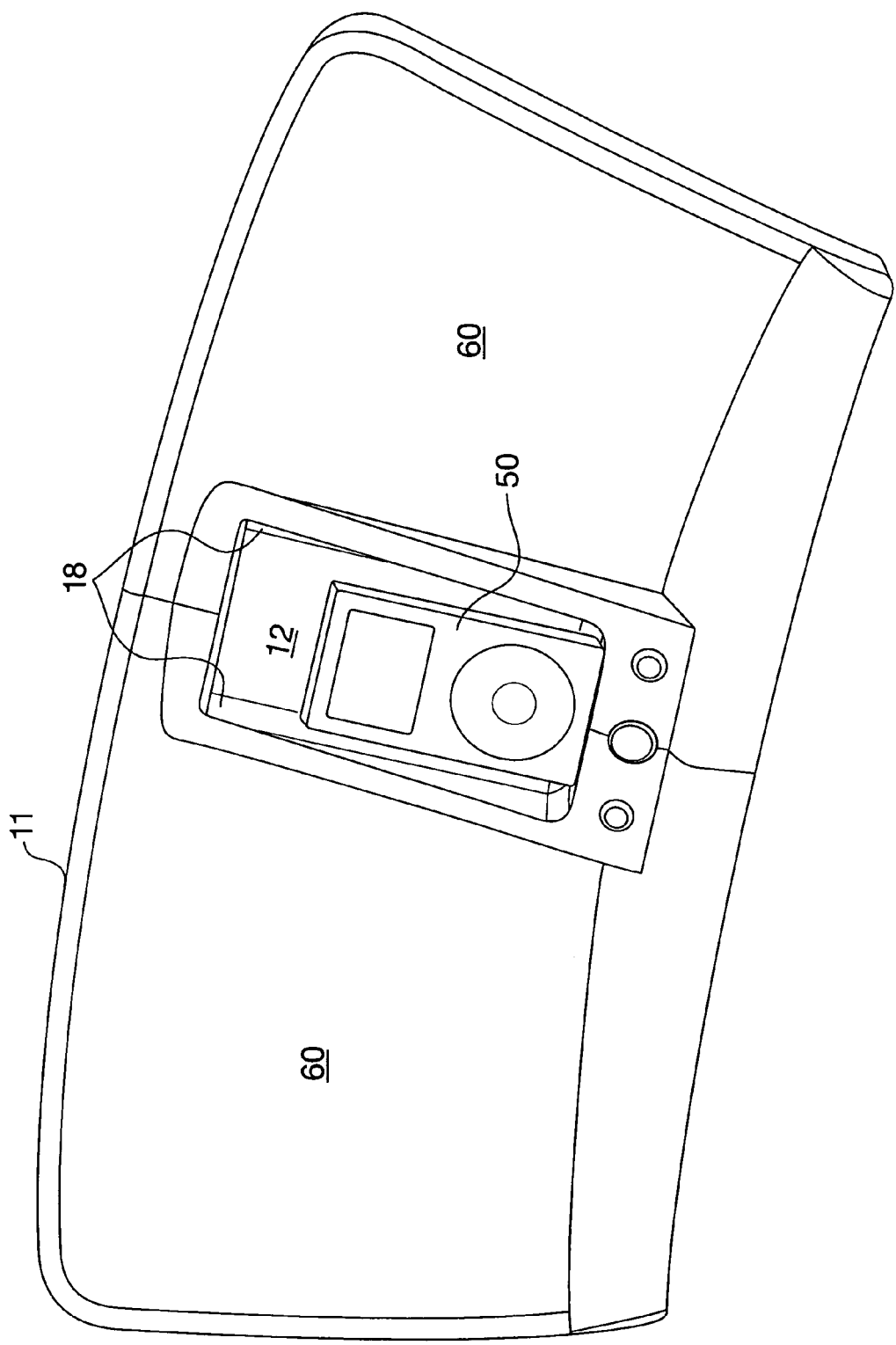
FIG. 2 is an elevation view of the mechanical connection assembly of FIG. 1, showing an IPOD digital music storage device in the docking port, according to one embodiment of the present invention.
Figure 3:
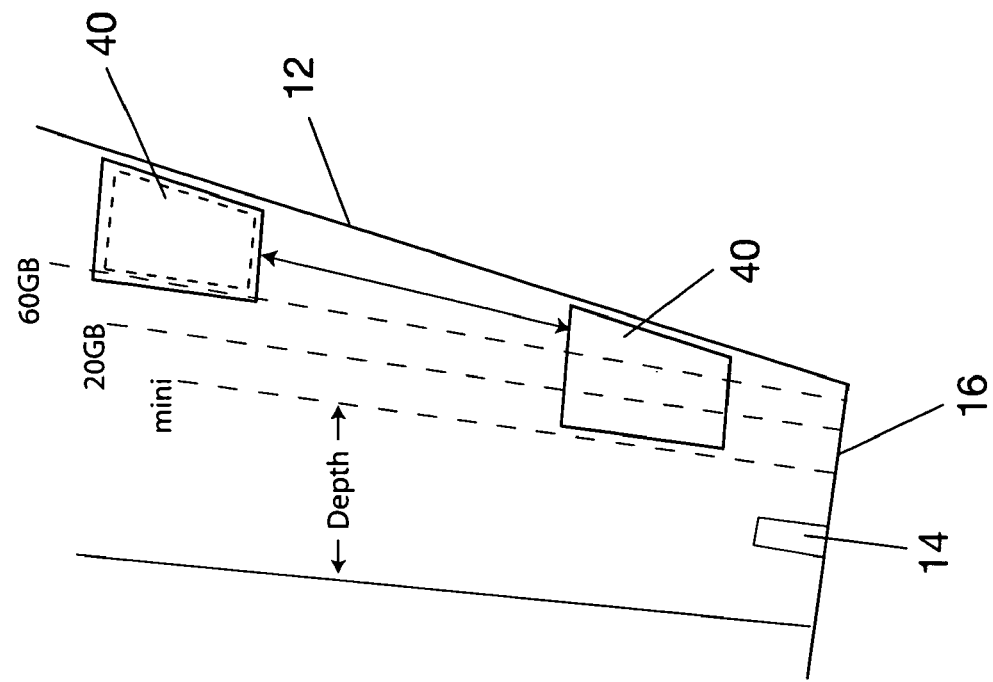
FIG. 3 is a side view of the mechanical connection assembly of FIG. 1, displaying how the wedge member may move up and down the angled rear wall to accommodate digital music storage devices of varying dimensions.
Figure 3:
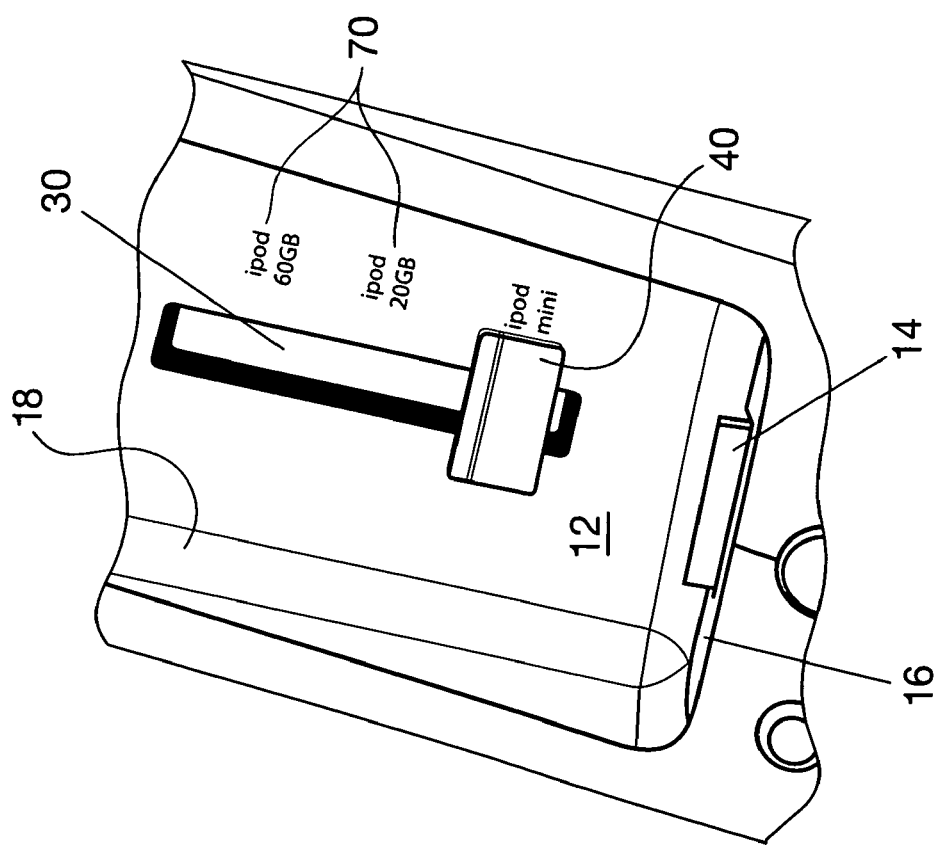

FIGS. 1-3 relate to a first embodiment of the present invention, a mechanical connection assembly 10 including a housing 11 defining a recess 12 with a standard IPOD connection port 14 located therein. The port 14 is typically located in the bottom portion of the recess 12. The recess defines a bottom wall 16 and two oppositely disposed sidewalls 18. The recess 12 also includes an angled rear wall 20 with a slot 30 positioned therein and a wedge member 40 slidably connected to the slot 30, such that the wedge member 40 may move up and down the angled rear wall 20 to effectively vary the depth of the recess 12. Typically, the rear wall 20 intersects the bottom wall 16 at an obtuse angle. As shown in FIGS. 2 and 3, an IPOD 50 of any size may be operationally coupled to the IPOD port 14, and the wedge member may be positioned anywhere from one end of the rear wall 20 to the other to snugly engage the IPOD regardless of its varying dimensions. The digital sound storage device connection port 14 electrically connects the IPOD 50 to at least one speaker 60, mounted in the housing 11. More typically, a pair of speakers 60 are mounted in housing 11. Still more typically, speakers 60 are positioned on opposite sides of the recess 12.

The wedge member 40 is manually adjusted to different positions in the slot 30. As shown in FIG. 3, the rear wall 20 may have markings 70 at different positions to denote wedge positions corresponding to popular IPOD sizes (i.e. mini, 20 GB, 60 GB). The slot 30 could also have catches, or indentures, formed therein corresponding to common wedge positions.

In another embodiment of the present invention, the connection port 14 may be adapted to connect with digital sound storage devices other than an IPOD. The connection port 14 may be adapted either by utilizing different electric connections or by utilizing a suitable adaptor.

In operation, a user may move the wedge member 40 up and down the angled rear wall 20 to effectively vary the depth of the recess 12. IPODs 50 of varying shapes and/or dimensions may thus be both mechanically and electrically coupled in the recess 12 to the standard IPOD connection port 14 and be snugly engaged regardless of IPOD size, and without the need for additional hardware.

While the invention has been illustrated and described in detail in the drawings and foregoing description, the same is to be considered as illustrative and not restrictive in character. It is understood that the embodiments have been shown and described in the foregoing specification in satisfaction of the best mode and enablement requirements. It is understood that one of ordinary skill in the art could readily make a nigh-infinite number of insubstantial changes and modifications to the above-described embodiments and that it would be impractical to attempt to describe all such embodiment variations in the present specification. Accordingly, it is understood that all changes and modifications that come within the spirit of the invention are desired to be protected.

What is claimed is:

1. An audio player assembly comprising:
   a housing; and
   at least one speaker mounted in the housing;
   a recess formed in the housing and defining a bottom wall, a pair of oppositely disposed side walls and an angled rear wall;
   a digital sound storage device connection port formed in the recess and electrically connected to the speaker;
   a slot formed in the angled rear wall; and
   a wedge member slidably connected to the slot;
   wherein the wedge member may move along the slot to effectively vary the depth of the recess.

2. The audio player assembly of claim 1, wherein said digital sound storage device connection port is configured to couple in electric communication to an IPOD MP3 player.

3. The audio player assembly of claim 1, wherein said digital sound storage device connection port is configured to couple in electric communication to any suitable digital sound storage device.

4. The audio player assembly of claim 1, wherein the rear wall is marked at different positions to denote wedge positions corresponding to popular IPOD sizes.

5. A mechanical connection assembly, for snugly engaging digital sound storage devices of varying dimensions, comprising in combination:
   a housing;
   a speaker disposed in the housing;
   a recess formed in the housing wherein the recess further comprises:
      a bottom wall;
      a first side wall;
      a second, oppositely disposed sidewall;
      a rear wall;
      wherein rear wall intersects the bottom wall at an obtuse angle; and
   a digital sound storage device connection port located in the bottom portion of the recess;
   a slot positioned in the angled rear wall; and
   a wedge member slidably connected to the slot;
      wherein moving the wedge member along the slot effectively varies the depth of the recess;
      wherein digital sound storage devices of varying dimensions can be connected to the digital sound storage device connection port;
      wherein digital sound storage devices of varying dimensions are snugly engaged by the wedge member.

6. The audio player assembly of claim 5, wherein said digital sound storage device connection port is configured to couple in electric communication to an IPOD MP3 player.

7. The audio player assembly of claim 5, wherein said digital sound storage device connection port is configured to couple in electric communication to any suitable digital sound storage device.

8. The audio player assembly of claim 5, wherein the rear wall is marked at different positions to denote wedge positions corresponding to popular IPOD sizes.

9. A method of snugly engaging digital sound storage devices regardless of size and shape to a stationary speaker system, comprising the steps of:
   mounting a speaker in a housing;
   forming a recess in the housing, the recess defining a bottom wall, a pair of oppositely disposed side walls and a rear wall, wherein the rear wall intersects the bottom wall at an obtuse angle;
   operationally connecting a digital sound storage device connection port between the recess and the speaker;
   forming a slot in the angled rear wall;
   slidably connecting a wedge member to the slot;
   sliding the wedge member to a desired position;
   snugly inserting a digital sound storage device into the slot; and
   connecting the digital sound storage device in electric communication to the digital sound storage device connection port.

10. The method of claim 9, wherein said digital sound storage device comprises an IPOD MP3 player.

11. The method of claim 9, wherein said digital sound storage device comprises any suitable portable handheld multimedia asset player.

12. The method of claim 9, wherein the rear wall is marked at different positions to denote wedge positions corresponding to popular IPOD sizes.

* * * * *